(12) United States Patent
Tanaka (10) Patent No.: US 11,671,537 B2
(45) Date of Patent: Jun. 6, 2023

(54) IMAGE FORMING APPARATUS INCLUDING PRINTER AND READERS

(71) Applicant: TOSHIBA TEC KABUSHIKI KAISHA, Tokyo (JP)

(72) Inventor: Hiromasa Tanaka, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/460,003

(22) Filed: Aug. 27, 2021

(65) Prior Publication Data

US 2023/0065624 A1 Mar. 2, 2023

(51) Int. Cl.
*H04N 1/00* (2006.01)
*H04N 1/60* (2006.01)
*G03G 15/00* (2006.01)

(52) U.S. Cl.
CPC ..... *H04N 1/00029* (2013.01); *H04N 1/00477* (2013.01); *H04N 1/6033* (2013.01); *G03G 15/5062* (2013.01)

(58) Field of Classification Search
CPC .................................................. H04N 1/00029
USPC .................................................. 358/1.15, 1.1
See application file for complete search history.

(56) References Cited

U.S. PATENT DOCUMENTS

| 2014/0177016 A1* | 6/2014 | Wilsher | H04N 1/0005 358/406 |
| 2015/0350460 A1* | 12/2015 | Hirata | H04N 1/0057 358/498 |
| 2015/0350493 A1* | 12/2015 | Sakatani | H04N 1/6091 358/504 |
| 2018/0352109 A1* | 12/2018 | Netsu | H04N 1/1235 |

FOREIGN PATENT DOCUMENTS

| JP | 2004-328200 A | 11/2004 |
| JP | 2011-101175 A | 5/2011 |
| JP | 2012-078795 A | 4/2012 |
| JP | 2015-119397 A | 6/2015 |

* cited by examiner

*Primary Examiner* — Jacky X Zheng
(74) *Attorney, Agent, or Firm* — Foley & Lardner LLP (57) ABSTRACT

An image forming apparatus includes a printer, a first reader, a second reader, and a processor. The printer is configured to print an image having diagnostic information on a sheet of paper. The first reader is configured to read a first image from the sheet of paper. The second reader is configured to read a second image from the sheet of paper. The processor is configured to cause a display to display a diagnosis result of a defect based on the first image and the second image.

17 Claims, 11 Drawing Sheets

PLEASE MOUNT PRINTED DIAGNOSTIC IMAGE ON PLATEN AND PRESS "READ" BUTTON TO READ DIAGNOSTIC IMAGE.

[ CANCEL ] [ READ ]

FIG. 6

PLEASE SET PRINTED DIAGNOSTIC IMAGE ON DF, FIT PAPER CASSETTE FIRMLY IN ACCORDANCE WITH WIDTH OF PAPER, AND THEN PRESS "READ" BUTTON TO READ DIAGNOSTIC IMAGE.

[ CANCEL ] [ READ ]

FIG. 7

DEFECT DIAGNOSIS IS BEING PERFORMED.
PLEASE WAIT A MOMENT.

CANCEL

FIG. 8

| RESULT OF STREAK DIAGNOSIS IN FIRST IMAGE | RESULT OF STREAK DIAGNOSIS IN SECOND IMAGE | FINAL DIAGNOSIS RESULT |
|---|---|---|
| False | False | NO ABNORMALITY |
| False | True | DF STREAK ABNORMALITY |
| True | False | PRINTING SIDE STREAK ABNORMALITY |
| True | True | DF/PRINTING SIDE STREAK ABNORMALITY |

CAUSE OF DEFECT IS DIAGNOSED.
IT IS CONSIDERED THAT XX PORTION NEEDS
TO BE CLEANED.
PLEASE PRESS "NEXT" BUTTON AND CARRY OUT
CLEANING IN ACCORDANCE WITH DISPLAYED
PROCEDURE.

35

[ CANCEL ]  [ NEXT ]

PLEASE WIPE XX PORTION WITH CLOTH.

[ CANCEL ]  [ NEXT ]

IMAGE FORMING APPARATUS INCLUDING PRINTER AND READERS

FIELD

Embodiments described herein relate generally to an image forming apparatus.

BACKGROUND

There are image forming apparatuses diagnosing whether a defect has occurred on a scanning side or a printing side. Such an image forming apparatus prints a diagnostic image and scans printed paper. A user specifies an occurrence location of the defect by visually observing the paper on which an image is printed or scan data.

However, in the related art, the image forming apparatus has a problem that the image forming apparatus cannot diagnose the defect by itself.

In order to solve the above-mentioned problem, an image forming apparatus is described herein that is capable of diagnosing such defects.

DETAILED DESCRIPTION

In general, according to one embodiment, an image forming apparatus includes a printer, a first reading mechanism, a second reading mechanism, a monitor, and a processor. The printer prints a diagnostic image on a sheet of paper. The first reading mechanism reads a first image from the sheet of paper. The second reading mechanism reads a second image from the sheet of paper. The monitor displays information. The processor displays a diagnosis result of a defect based on the first image and the second image on the monitor.

First Embodiment

First, the first embodiment will be described.

The image forming apparatus according to the embodiment forms an image on a medium, such as a sheet of paper, by using toner. The image forming apparatus forms a toner image on a transfer body, such as a transfer belt. The image forming apparatus transfers the toner image formed on the transfer body to the medium, such as a sheet of paper. The image forming apparatus allows the toner to be fixed on the medium by heating the medium to which the toner image is transferred.

The image forming apparatus diagnoses a defect by printing an image (diagnostic image, image having diagnostic information) for diagnosis of the defect. That is, the image forming apparatus specifies presence or absence of the defect and an occurrence location of the defect.

Figure 1:
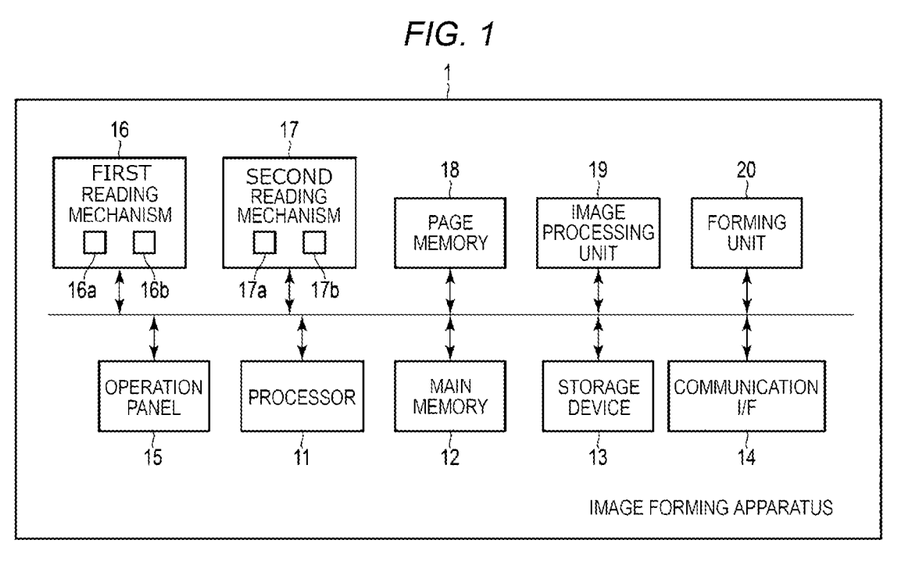
FIG. 1 is a block diagram illustrating a configuration example of an image forming apparatus according to a first embodiment.

FIG. 1 illustrates a configuration example of an image forming apparatus 1 according to the embodiment. As illustrated in FIG. 1, the image forming apparatus 1 includes a processor 11, a main memory 12, a storage device 13, a communication interface (I/F) 14 (communicator), an operation panel 15, a first reading mechanism. 16 (first reader) (such as a flatbed scanner), a second reading mechanism. 17 (second reader) (such as a scanner which a document feeder (DF) has in a document feeding path thereof), a page memory 18, an image processing unit 19, a forming unit 20, and the like. These components are connected to each other via a data bus or the like.

It is noted that the image forming apparatus 1 may have a configuration as required in addition to the configuration illustrated in FIG. 1, or a specific configuration may be excluded from the image forming apparatus 1.

The processor 11 has functions of controlling operations of the entire image forming apparatus 1. The processor 11 may include an internal memory, various interfaces, and the like. The processor 11 implements various processes by executing a program stored in advance in the internal memory, the storage device 13, or the like.

It is noted that some of the various functions implemented by allowing the processor 11 to execute the program may be implemented by a hardware circuit. In this case, the processor 11 controls functions executed by the hardware circuit.

The main memory 12 is a volatile memory. The main memory 12 is a working memory or a buffer memory. The main memory 12 stores various application programs based on instructions from the processor 11. In addition, the main memory 12 may store data necessary for executing the application program, an execution result of the application program, and the like.

The storage device 13 is a non-volatile memory capable of writing and rewriting data. The storage device 13 is configured with, for example, a hard disk drive (HDD), a solid state drive (SSD), a flash memory, or the like. The storage device 13 stores a control program, an application, various data, and the like, according to the operational use of the image forming apparatus 1.

In addition, the storage device 13 stores a diagnosis table. The diagnosis table will be described later.

The communication interface 14 is an interface for transmitting and receiving data to and from an external device.

For example, the communication interface 14 may transmit and receive data to and from the external device via a network, such as the Internet. For example, the communication interface 14 may support wired or wireless local area network (LAN) connection.

Various instructions are input to the operation panel 15 by the user of the image forming apparatus 1. The operation panel 15 transmits a signal indicating an instruction input from the user to the processor 11. The operation panel 15 includes, for example, a keyboard, a numeric keypad, a touch panel, or the like, as an operation unit. Herein, the operation panel 15 includes the touch panel as the operation unit.

In addition, the operation panel 15 displays various information to the user of the image forming apparatus 1. That is, the operation panel 15 displays a screen illustrating various information based on signals from the processor 11. The operation panel 15 includes, for example, a liquid crystal display as a display unit. The display unit of the operation panel 15 is integrally formed with the touch panel as an operation unit.

The first reading mechanism 16 (first reader) is a device that scans a document set on a platen. The first reading mechanism 16 includes a conveying mechanism 16a, a sensor 16b, and the like.

The sensor 16b is formed on a lower portion of the platen. The sensor 16b is configured with a sensor array aligned in a main scanning direction. The sensor 16b reads the image from the document set on the platen. Herein, the sensor 16b reads the document in color.

The sensor 16b is conveyed in a sub-scanning direction by the conveying mechanism 16a. The sensor 16b reads the entire document by being conveyed in the sub-scanning direction.

The conveying mechanism 16a conveys the sensor 16b in the sub-scanning direction. The conveying mechanism 16a includes a rail for guiding the sensor 16b, a motor for conveying the sensor 16b, and the like.

The first reading mechanism 16 may be a device that scans, using the sensor 16b which is set at a predetermined position, the document which a DF or other conveying mechanism is conveying.

The second reading mechanism 17 (second reader) is a device that scans the document by using a DF. The second reading mechanism 17 is configured with a DF 17a, a sensor 17b, and the like.

The DF 17a is formed on an upper portion of the image forming apparatus 1. The DF 17a has a structure in which the plurality of documents can be set. The DF 17a picks up the set documents one by one. The DF 17a supplies the picked-up document to the sensor 17b. The DF 17a conveys the document in the sub-scanning direction. The DF 17a allows a region readable by the sensor 17b to pass through the document. In addition, the DF 17a has a structure in which the DF 17a lumps up to the upper portion. If the DF 17a jumps up, the platen is exposed.

For example, the DF 17a may be configured with a pickup roller, a convey roller, a motor, and the like.

The sensor 17b is configured with a sensor array aligned in the main scanning direction. The sensor 17b reads an image from the document fed by the DF 17a. Herein, the sensor 17b reads the document in color. The sensor 17b reads the entire document by reading the image from the document conveyed in the sub-scanning direction.

The second reading mechanism 17 may be the same type as the first reading mechanism 16. The second reading mechanism 17 may be the different type from the first reading mechanism 16. The second reading mechanism 17 may be a device that scans the document which a DF or other conveying mechanism is conveying as same type as the first reading mechanism 16. The second reading mechanism 17 may be a device that scans the document set on the platen as same type as the first reading mechanism 16.

The second reading mechanism 17 supplies image data obtained by reading the document to the processor 11.

It is noted that the first reading mechanism 16 and the second reading mechanism 17 may share the sensor. That is, the sensor 16b and the sensor 17b may be the same sensor.

The page memory 18 stores the image data from, the first reading mechanism 16 and the second reading mechanism 17.

The image processing unit 19 processes the image data stored in the page memory 18 so that the forming unit 20 can print the image data on the sheet of paper. For example, the image processing unit 19 may enlarge or reduce the image data.

The forming unit 20 (printer) prints the image data processed by the image processing unit 19 on the sheet of paper based on the control of the processor 11.

The forming unit 20 prints the image data on the sheet of paper by an electrophotographic method. The forming unit 20 includes a transfer body, a photoconductor drum that transfers a toner image to the transfer body, a transfer roller that transfers the toner image from the transfer body to the sheet of paper, a heater that heats the sheet of paper to which the toner image is transferred, and the like.

Next, the functions implemented by the image forming apparatus 1 will be described. The function implemented by the image forming apparatus 1 is implemented by allowing the processor 11 to execute the program stored in the internal memory, the storage device 13, or the like.

First, the processor 11 has a function of printing the diagnostic image.

For example, the processor 11 may receive the input of the operation for starting the diagnosis of the defect through the operation panel 15. Herein, the defect is associated with the first reading mechanism 16, the second reading mechanism, 17, or the forming unit 20.

Figure 2:
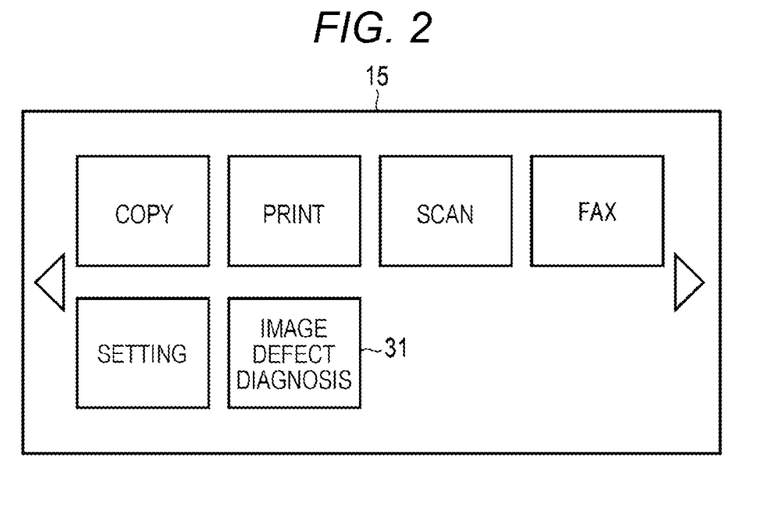
FIG. 2 is a diagram illustrating a display example of the image forming apparatus.

FIG. 2 illustrates an example of an operation screen displayed for the processor 11 to receive the input of the operation for starting the diagnosis of the defect. As illustrated in FIG. 2, the operation panel 15 displays an icon 31 and the like.

The icon 31 receives the input of the operation for starting the diagnosis of the defect. If the processor 11 detects a tap of the icon 31, the processor 11 determines that the input of the operation for starting the diagnosis of the defect is received.

It is noted that the operation panel 15 may display other icons.

If the input of the operation for starting the diagnosis of the defect is received, the processor 11 receives the input of the operation for printing the diagnostic image through the operation panel 15.

Figure 3:
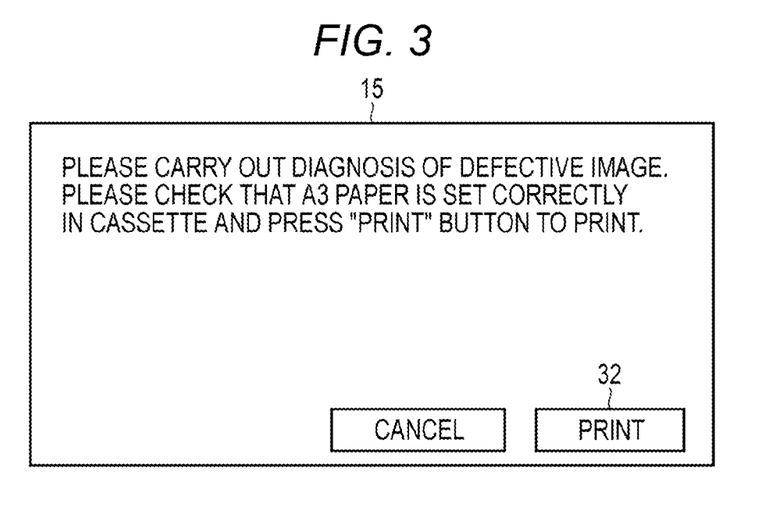
FIG. 3 is another diagram illustrating the display example of the image forming apparatus.

FIG. 3 illustrates an example of the operation screen displayed by the processor 11 for receiving the input of the operation for printing the diagnostic image. As illustrated in FIG. 3, the operation panel 15 displays an icon 32 and the like.

The icon 32 receives the input of the operation of printing the diagnostic image. If the processor 11 detects the tap of the icon 32, the processor 11 determines that the input of the operation for printing the diagnostic image is received.

In addition, the operation panel 15 may display a message indicating the size of the sheet of paper on which the diagnostic image is printed, a cassette in which the sheet of paper is set, and the like. For example, as illustrated in FIG. 3, the operation panel 15 may display a message urging to check the cassette for storing the sheet of paper.

If the input of the operation for printing the diagnostic image is received, the processor 11 prints the diagnostic image on the sheet of paper by using the forming unit 20.

The diagnostic image is used by the processor 11 to diagnose the defect on the printing side or the scanning side. For example, the diagnostic image may be used by the processor 11 for detecting the abnormality, such as a change in density of each toner, occurrence of color unevenness, or occurrence of a streak.

Figure 4:
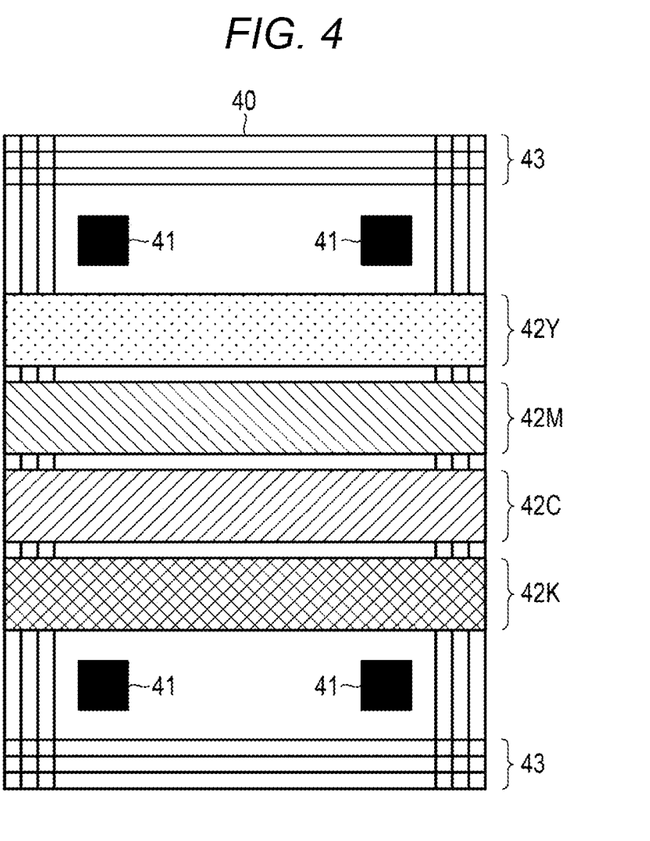
FIG. 4 is a diagram illustrating an example of a diagnostic image.

FIG. 4 illustrates an example of a diagnostic image 40. As illustrated in FIG. 4, the diagnostic image 40 is configured with anchors 41, bands 42, ruled lines 43, and the like.

The anchors 41 are formed at the four corners. The anchors 41 are formed at positions separated inward by a predetermined distance (target distance) from the corners. The anchor 41 is configured with a solid black square. For example, the anchor 41 may be used by the processor 11 to detect the inclination or the deviation of the scanned diagnostic image.

Each of the bands 42 is formed to have a predetermined width (target width). In addition, the band 42 is formed between one end and the other end of the diagnostic image 40 in the lateral direction. In addition, the band 42 is formed in the middle of the diagnostic image 40 in the longitudinal direction.

The band 42 is a halftone band formed by toners of the respective colors.

Herein, the band 42 is configured with bands 42Y, 42M, 42C, and 42K. The band 42Y is formed of yellow toner. The band 42M is formed of magenta toner. The band 42C is formed of cyan toner. The band 42K is formed of black toner.

For example, the band 42 may be used by the processor 11 to detect the streak.

The ruled line 43 is configured with a plurality of lines. In addition, the ruled line 43 is formed between one end and the other end of the diagnostic image 40 in the lateral direction. In addition, the ruled line 43 is formed at the upper end or the lower end of the diagnostic image 40.

For example, the ruled line 43 may be used by the processor 11 to detect the inclination or vertical or horizontal deviation of the diagnostic image 40.

It is noted that the configuration of the diagnostic image 40 is not limited to a specific configuration.

In addition, the processor 11 has a function of scanning the sheet of paper on which the diagnostic image 40 is printed by using the first reading mechanism 16.

If the diagnostic image 40 is printed on the sheet of paper, the processor 11 receives the input of the operation of performing the scan using the first reading mechanism 16 through the operation panel 15.

Figure 5:
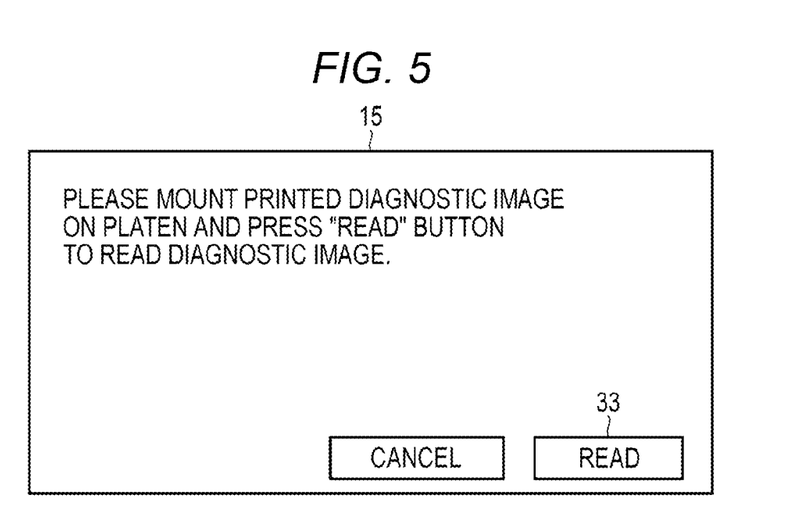
FIG. 5 is another diagram illustrating the display example of the image forming apparatus.

FIG. 5 illustrates an example of the operation screen displayed for receiving the input of the operation for performing the scan using the first reading mechanism 16. As illustrated in FIG. 5, the operation panel 15 displays the icon 33 and the like.

The icon 33 receives the input of the operation for performing the scan using the first reading mechanism 16. If the processor 11 detects the tap of the icon 33, the processor 11 determines that the input of the operation of performing the scan using the first reading mechanism 16 is received.

In addition, as illustrated in FIG. 5, the operation panel 15 may display a message or the like urging a user to set the sheet of paper on which the diagnostic image 40 is printed on the platen.

Herein, the user sets the sheet of paper on which the diagnostic image 40 is printed on the platen and taps the icon 33.

If the input of the operation for performing the scan using the first reading mechanism 16 is received, the processor 11 scans the sheet of paper mounted on the platen by using the first reading mechanism 16. The processor 11 acquires the image data (first image) obtained by scanning the sheet of paper by the first reading mechanism 16.

In addition, the processor 11 has a function of scanning the sheet of paper on which the diagnostic image 40 is printed by using the second reading mechanism 17.

If the first image is acquired, the processor 11 receives the input of the operation of performing the scan using the second reading mechanism 17 through the operation panel 15.

Figure 6:
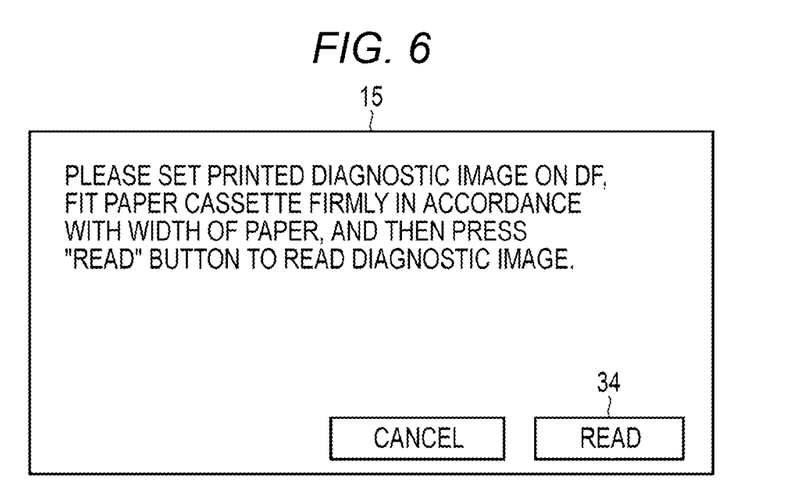
FIG. 6 is another diagram illustrating the display example of the image forming apparatus.

FIG. 6 illustrates an example of the operation screen displayed for receiving the input of the operation for performing the scan using the second reading mechanism 17. As illustrated in FIG. 6, the operation panel 15 displays the icon 34 and the like.

The icon 34 receives the input of the operation for performing the scan using the second reading mechanism 17. If the processor 11 detects the tap of the icon 34, the processor 11 determines that the input of the operation for performing the scan using the second reading mechanism 17 is received.

In addition, as illustrated in FIG. 6, the operation panel 15 may display a message or the like urging the scanner 17a to set the sheet of paper on which the diagnostic image 40 is printed.

Herein, the user sets the sheet of paper on which the diagnostic image 40 is printed on the DF 17a and taps the icon 34.

If the input of the operation for performing the scan using the second reading mechanism 17 is received, the processor 11 scans the sheet of paper set on the DF 17a by using the second reading mechanism 17. The processor 11 acquires the image data (second image) obtained by scanning the sheet of paper with the second reading mechanism 17.

In addition, the processor 11 has a function of diagnosing the defect based on the first image and the second image.

If the second image is acquired, the processor 11 specifies the presence or absence of the defect and the occurrence location of the defect. Herein, the processor 11 displays a message indicating that the processor 11 is diagnosing the defect through the operation panel 15.

Figure 7:
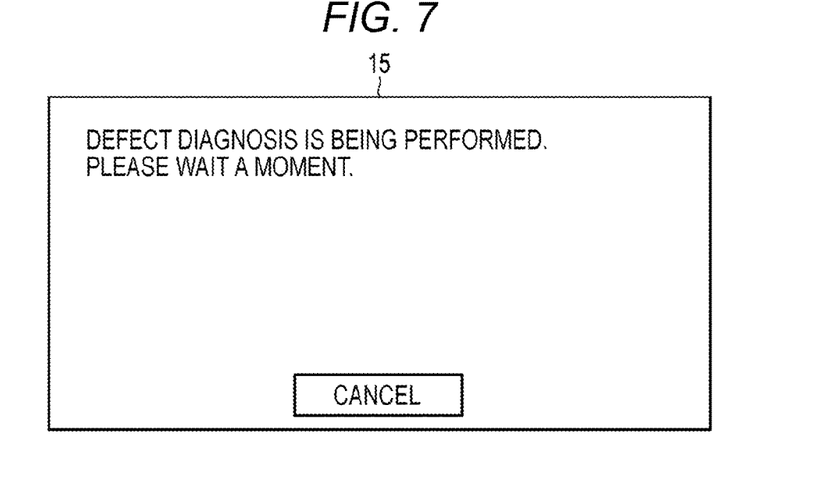
FIG. 7 is another diagram illustrating the display example of the image forming apparatus.

FIG. 7 illustrates an example of the operation screen that displays the message indicating that the processor 11 is diagnosing the defect. As illustrated in FIG. 7, the operation panel 15 displays the message indicating that the processor 11 is diagnosing the defect.

Herein, the processor 11 detects the streak (first streak) from the first image.

The storage device 13 stores in advance an inference model for detecting the streak. For example, the inference model may be a model obtained by deep learning based on a data set in which the image obtained by scanning and the presence or absence of the defect (herein, the presence or absence of the streak) are associated with each other. For example, the inference model may be a neural network or the like.

The processor 11 detects the streak from the first image by using the inference model. That is, the processor 11 determines the presence or absence of the streak in the first image.

If the presence or absence of the streak in the first image is determined, the processor 11 detects that an abnormality (second abnormality) has occurred in the second image. Herein, the processor 11 detects the streak (second streak) from the second image.

The processor 11 detects the streak from the second image by using the inference model. That is, the processor 11 determines the presence or absence of the streak in the second image.

It is noted that the inference model for detecting the streak from the first image and the inference model for detecting the streak from the second image may be the same as or different from each other.

If the streak is detected from the second image, the processor 11 determines the presence or absence of the defect and the occurrence location of the defect based on the detection result of the streak in the first image and the detection result of the streak in the second image. That is, the processor 11 specifies the presence or absence of the defect and the occurrence location of the defect based on the presence or absence of the streak in the first image and the presence or absence of the streak in the second image.

Figure 8:
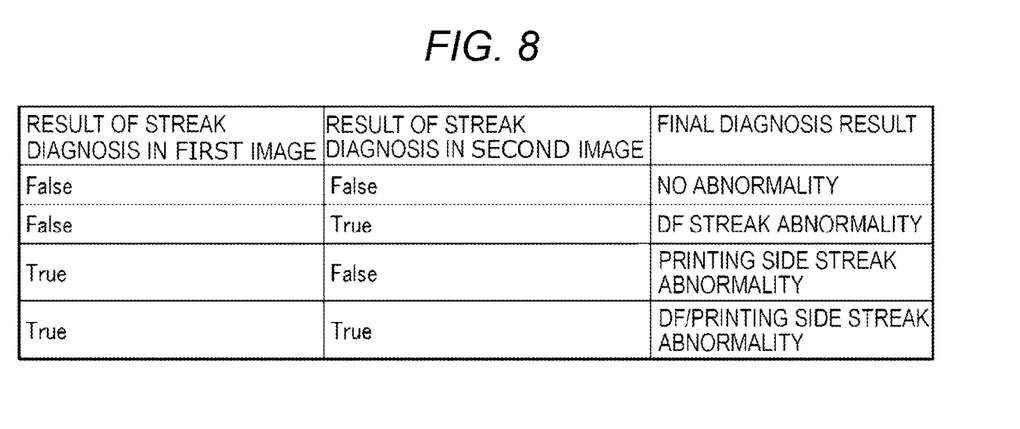
FIG. 8 is a diagram illustrating a configuration example of a diagnosis table.

The storage device 13 stores in advance the diagnosis table for diagnosing the defect.

The diagnosis table stores each detection result in association with the diagnosis of the defect (the presence or absence of the defect and the occurrence location of the defect).

FIG. 8 illustrates a configuration example of the diagnosis table. As illustrated in FIG. 8, the diagnosis table stores the "result of streak diagnosis in first image," the "result of streak diagnosis in second image," and the "final diagnosis result" in association with each other.

The "result of streak diagnosis in first image" indicates the presence or absence of the streak in the first image. "True" indicates that there is a streak in the first image. "False" indicates that there is no streak in the first image.

The "result of streak diagnosis in second image" indicates the presence or absence of the streak in the second image. "True" indicates that there is a streak in the second image. "False" indicates that there is no streak in the second image.

The "final diagnosis result" indicates the presence or absence of the defect and the occurrence location of the defect in the case of the corresponding "result of streak diagnosis in first image" and the corresponding "result of streak diagnosis in second image."

Herein, the diagnosis table specifies the presence or absence of the defect and the occurrence location of the defect, under the assumption that there is no defect in the first reading mechanism 16.

For example, if the "result of streak diagnosis in first image" is "false" and the "result of streak diagnosis in second image" is "false," the diagnosis table may indicate that there is no defect.

In addition, if the "result of streak diagnosis in first image" is "false" and the "result of streak diagnosis in second image" is "true," the diagnosis table indicates that the defect occurs in the second reading mechanism 17.

In addition, if the "result of streak diagnosis in first image" is "true" and the "result of streak diagnosis in second image" is "false," the diagnosis table indicates that the defect occurs in the forming unit 20.

In addition, if the "result of streak diagnosis in first image" is "true" and the "result of streak diagnosis in second image" is "true," the diagnosis table indicates that the defect occurs in the second reading mechanism 17 and the forming unit 20.

It is noted that the configuration of the diagnosis table is not limited to a specific configuration.

In addition, the diagnosis table may be updated as appropriate.

The processor 11 specifies the presence or absence of the defect and the occurrence location of the defect according to the diagnosis table.

In addition, the processor 11 has a function of presenting the diagnosis result.

If the defect is diagnosed, the processor 11 displays the diagnosis result through the operation panel 15.

For example, if the processor 11 diagnosed that the defect occurs, the processor 11 may display the fact that the defect occurs, the location (occurrence location) that the defect occurs, and the method for solving the defect as the diagnosis results through the operation panel 15.

Figure 9:
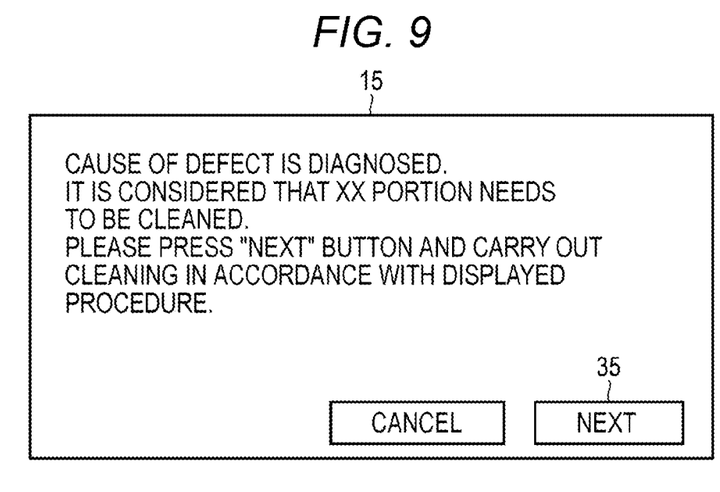
FIG. 9 is another diagram illustrating the display example of the image forming apparatus.

FIG. 9 illustrates an example of the operation screen in which the processor 11 displays the diagnosis result. In the example illustrated in FIG. 9, the operation panel 15 displays a message indicating that an XX portion is an occurrence location of a defect. In addition, the operation panel 15 displays a message indicating cleaning of the XX portion as a solution.

In addition, the operation panel 15 displays an icon 35.

The icon 35 receives an input of an operation that displays the more specific solution.

If the processor 11 detects the tap of the icon 35, the processor 11 displays the more specific solution through the operation panel 15.

Figure 10:
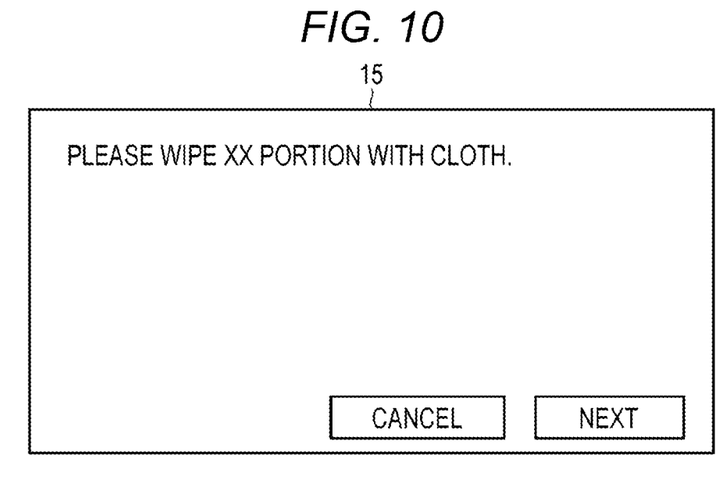
FIG. 10 is another diagram illustrating the display example of the image forming apparatus.

FIG. 10 illustrates an example of an operation screen displaying a more specific solution. As illustrated in FIG. 10, the operation panel 15 displays a more specific method for cleaning the XX portion.

It is noted that the operation panel 15 may display a diagram or the like illustrating the solution. For example, the operation panel 15 may display an illustration or the like for guiding the cleaning of a predetermined place (target area).

In addition, if there is no defect, the processor 11 displays a message or the like indicating that there is no defect through the operation panel 15.

The screen on which the processor 11 displays the diagnosis result is not limited to a specific configuration.

Next, an operation example of the image forming apparatus 1 will be described.

Figure 11:
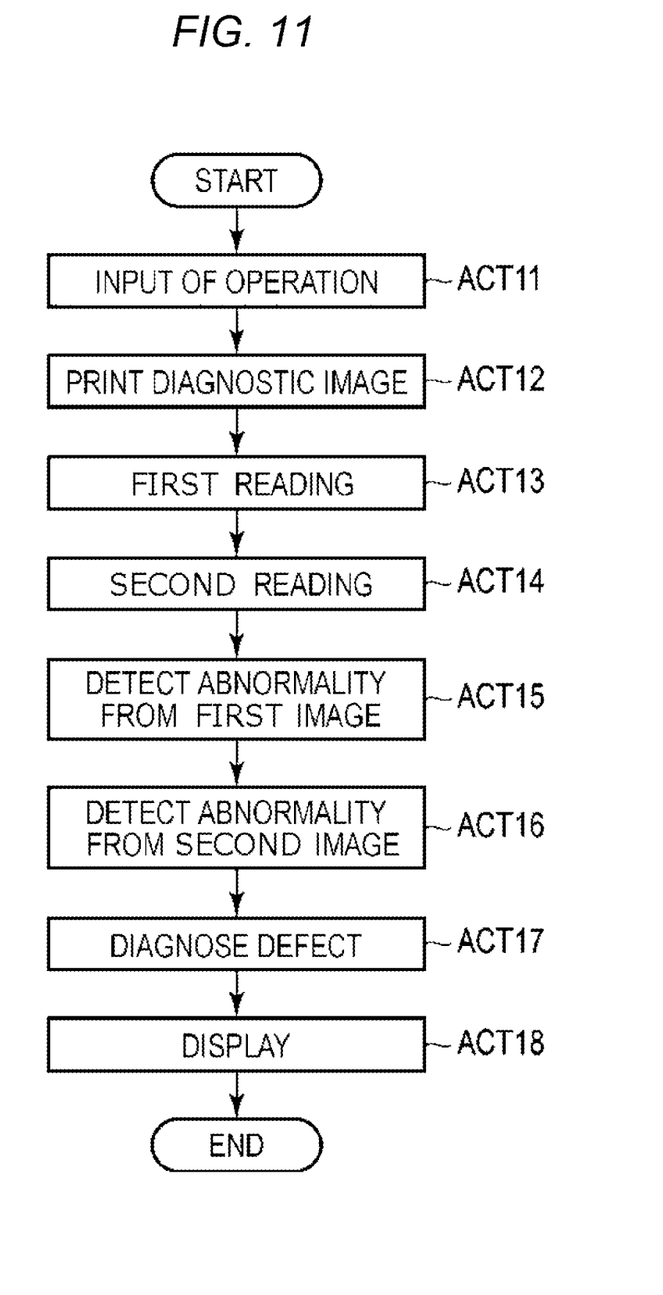
FIG. 11 is a flowchart illustrating an operation example of the image forming apparatus.

FIG. 11 is a flowchart illustrating the operation example of the image forming apparatus 1.

First, the processor 11 of the image forming apparatus 1 receives an input of an operation for starting the diagnosis of the defect through the operation panel 15 (ACT11). If the input of the operation for starting the diagnosis of the defect is received, the processor 11 prints the diagnostic image 40 on the sheet of paper by using the forming unit 20 (ACT12).

If the diagnostic image 40 is printed on the sheet of paper, the processor 11 scans the sheet of paper on which the diagnostic image 40 is printed by using the first reading mechanism 16 (ACT13). If the sheet of paper is scanned by using the first reading mechanism 16, the processor 11 scans the sheet of paper on which the diagnostic image 40 is printed by using the second reading mechanism 17 (ACT14).

If the sheet of paper is scanned by using the second reading mechanism 17, the processor 11 detects the abnormality (first abnormality) from the first image (ACT15). If the abnormality is detected from the first image, the processor 11 detects the abnormality (second abnormality) from the second image (ACT16).

If the abnormality is detected from, the second image, the processor 11 diagnoses the defect based on the detection result from the first image and the detection result from the second image (ACT17). If the defect is diagnosed, the processor 11 displays the diagnosis result through the operation panel 15 (ACT18).

If the diagnosis result is displayed, the processor 11 ends the operation.

It is noted that the processor 11 may detect the type (position, size, mode, or the like) of the streak in addition to the presence or absence of the streak as the abnormality detected from the first image and the second image. In addition, the processor 11 may detect the abnormality (deviation, skew, dirt, distortion, or the like) other than the streak from the first image and the second image.

In the above case, the diagnosis table illustrates the defects corresponding to combinations of abnormalities. The processor 11 diagnoses the defect according to the diagnosis table.

In addition, the processor 11 may diagnose the defect based on the detection result from the first image and the second image by using the inference model. For example, the inference model may be a model obtained by deep learning based on a data set of the detection results from the first images and the second images and the defect (presence or absence and occurrence location).

In addition, the processor 11 may acquire the inference model for detecting the abnormality from the first image and the second image from the external device through the communication interface 14. The processor 11 stores the acquired inference model in the storage device 13.

In addition, if the processor 11 acquires the first image, the processor 11 may detect the abnormality from the first image before acquiring the second image. In addition, the processor 11 may acquire the second image before the first image.

In addition, the processor 11 may generate the combined image of the first image and the combined image of the second image by extracting a portion necessary for diagnosis of the defect from the first image and the second image. In this case, the processor 11 may detect the abnormality from the combined image of the first image and the combined image of the second image, respectively. In addition, the method in which the processor 11 generates the combined image may be the same as that in the second embodiment.

The image forming apparatus configured as described above prints the diagnostic image on the sheet of paper. The image forming apparatus scans the sheet of paper by using the first reading mechanism and the second reading mechanism. The image forming apparatus detects the abnormality from each image obtained by scanning. The image forming apparatus specifies the presence or absence of the defect and the occurrence location of the defect in the image forming apparatus based on the detection result of each image. As a result, the image forming apparatus can diagnose the defect without depending on the user's visual observation.

Second Embodiment

Next, a second embodiment will be described.

An image forming apparatus according to the second embodiment is different from that of the first embodiment in that the server is allowed to perform the diagnosis of the defect. Therefore, other configurations are denoted by the same reference numerals, and the detailed description thereof will be omitted.

Figure 12:
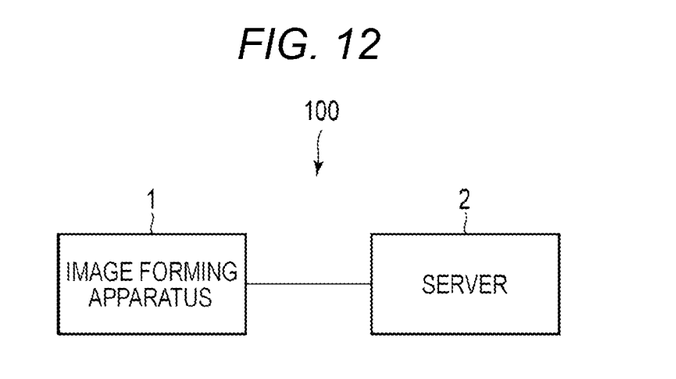
FIG. 12 is a block diagram illustrating a configuration example of a diagnostic system according to a second embodiment.

FIG. 12 illustrates a configuration example of a diagnostic system 100 according to the second embodiment. As illustrated in FIG. 12, the diagnostic system 100 includes an image forming apparatus 1 and a server 2.

Since the configuration of the image forming apparatus 1 is the same as that of the first embodiment, the description thereof will be omitted.

The server 2 diagnoses the defect based on the image from the image forming apparatus 1. The server 2 transmits the diagnosis result of the defect to the image forming apparatus 1.

Figure 13:
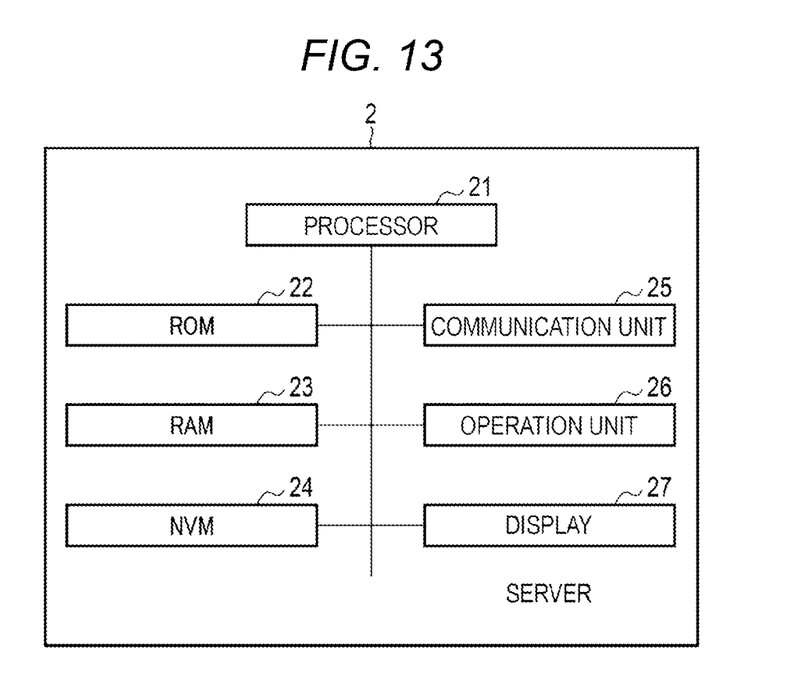
FIG. 13 is a block diagram illustrating a configuration example of a server.

FIG. 13 illustrates a configuration example of the server 2. As illustrated in FIG. 13, the server 2 includes a processor 21, a ROM 22, a RAM 23, a non-volatile memory (NVM) 24, a communication unit 25, an operation unit 26, a display unit 27 (display), and the like.

The processor 21, the ROM 22, the RAM 23, the NVM 24, the communication unit 25, the operation unit 26, and the display unit 27 are connected to one another via a data bus or the like.

It is noted that, in addition to the configuration illustrated in FIG. 13, the server 2 may have a configuration as required, or a specific configuration may be excluded from the server 2.

The processor 21 has functions of controlling the operation of the entire server 2. The processor 21 may include an internal cache, various interfaces, and the like. The processor 21 implements various processes by executing a program stored in advance in the internal memory, the ROM 22, or the NVM 24.

It is noted that some of the various functions implemented by allowing the processor 21 to execute a program may be implemented by the hardware circuit. In this case, the processor 21 controls the functions performed by the hardware circuits.

The ROM 22 is a non-volatile memory storing the control program, the control data, and the like in advance. The control program and the control data stored in the ROM 22 are incorporated in advance according to the specifications of the server 2.

The RAM 23 is a volatile memory. The RAM 23 temporarily stores data and the like being during processing by the processor 21. The RAM 23 stores various application programs based on instructions from the processor 21. In addition, the RAM 23 may store data necessary for executing the application program, an execution result of the application program, and the like.

The NVM 24 is a non-volatile memory capable of writing and rewriting data. The NVM 24 is configured with, for example, an HDD, an SSD, a flash memory, or the like. The NVM 24 stores a control program, an application, various data, and the like according to the operational use of the server 2.

The NVM 24 also stores a diagnosis table.

The communication unit 25 is an interface for connecting to the image forming apparatus 1. For example, the communication unit 25 may transmit and receive data to and from the image forming apparatus 1 or the like via the network, such as the Internet. For example, the communication unit 25 may be an interface that supports the wired or wireless LAN connection.

The operation unit 26 receives inputs for various operations from the operator. The operation unit 26 transmits signals indicating the input operation to the processor 21. The operation unit 26 may be configured with a touch panel.

The display unit 27 displays the image data from the processor 21. For example, the display unit 27 may be configured with a liquid crystal monitor. If the operation unit 26 is configured with a touch panel, the display unit 27 may be integrally formed with the operation unit 26.

Next, the functions implemented by the image forming apparatus 1 will be described. The functions implemented by the image forming apparatus 1 are implemented by allowing the processor 11 to execute the program stored in the internal memory, the storage device 13, or the like.

The image forming apparatus 1 implements the following functions in addition to the functions of the image forming apparatus 1 according to the first embodiment.

The processor 11 has a function of extracting a portion necessary for diagnosis of the defect from the first image and the second image.

If the first image and the second image are acquired, the processor 11 generates a combined image (first combined image) by extracting a portion necessary for diagnosis of the defect from the first image.

Figure 14:
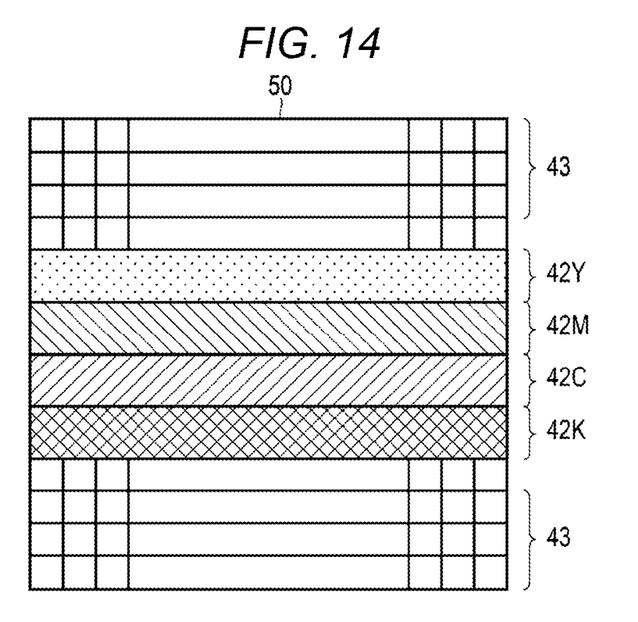
FIG. 14 is a diagram illustrating an example of a combined image.

FIG. 14 illustrates an example of a combined image 50. As illustrated in FIG. 14, the combined image 50 is configured with a band 42, a ruled line 43, and the like.

The band 42 is formed in the middle of the combined image 50.

In addition, the ruled line 43 is formed at the upper end and the lower end of the combined image 50. In addition, the ruled line 43 is formed adjacent to the band 42.

For example, the processor 11 may extract a region (target region) of the band 42 and a region (target region) of the ruled line 43 from, the first image. If the region of the band 42 and the region of the ruled line 43 are extracted, the processor 11 generates the combined image by combining the extracted regions.

Similarly, the processor 11 generates a combined image (second combined image, second combined image) by extracting a portion necessary for diagnosis of the defect from, the second image.

It is noted that the processor 11 may resize (resolution conversion) the first combined image and the second combined image.

The configuration of the first combined image and the configuration of the second combined image are not limited to a specific configuration.

In addition, the processor 11 has a function of transmitting the first combined image and the second combined image to the server 2.

If the first combined image and the second combined image are generated, the processor 11 generates a request for requesting the diagnosis of the defect. The request includes the first combined image and the second combined image.

If the request is generated, the processor 11 transmits the generated request to the server 2 through the communication interface 14.

In addition, the processor 11 has a function of receiving the diagnosis result from the server 2.

If the request is transmitted to the server 2, the processor 11 waits until a response including the diagnosis result is received from the server 2.

If the response is received, the processor 11 acquires the diagnosis result from the received response.

If the diagnosis result is acquired, the processor 11 displays the diagnosis result through the operation panel 15.

An operation example in which the processor 11 displays the diagnosis result is as described above.

Next, the functions implemented by the server 2 will be described. The function implemented by the server 2 is implemented by allowing the processor 21 to execute the program stored in the internal memory, the ROM 22, the NVM 24, or the like.

The processor 21 has a function of diagnosing the defect based on the first combined image and the second combined image.

First, the processor 21 receives the request for diagnosis of the defect from the image forming apparatus 1 through the communication unit 25. The request includes the first combined image and the second combined image.

If the request is received, the processor 21 detects that the abnormality has occurred in the first combined image. Herein, the processor 21 detects the streak from the first combined image.

The method of allowing the processor 21 to detect the streak from the first combined image is the same as the method of allowing the processor 11 to detect the streak from the first image, and thus, the description thereof will be omitted.

If the streak is detected from the first combined image, the processor 21 detects that the abnormality has occurred in the second combined image. Herein, the processor 21 detects the streak from the second combined image.

The method of allowing the processor 21 to detect the streak from the second combined image is the same as the method of allowing the processor 11 to detect the streak from the second image, and thus, the description thereof will be omitted.

If the streak is detected from the second image, the processor 21 determines the presence or absence of the defect and the occurrence location of the defect based on the detection result of the streak in the first combined image and the detection result of the streak in the second combined image. That is, the processor 21 specifies the presence or absence of the defect and the occurrence location of the defect based on the presence or absence of the streak in the first combined image and the presence or absence of the streak in the second combined image.

For example, the processor 21 may specify the presence or absence of the defect and the occurrence location of the defect according to the diagnosis table. Herein, the diagnosis table is a diagnosis table in which the "first image" is changed to the "first combined image" and the "scanner image" is changed to the "second combined image" in the diagnosis table of FIG. 8.

If the defect is diagnosed, the processor 21 transmits the response including the diagnosis result to the image forming apparatus 1 through the communication unit 25.

Next, an operation example of the diagnostic system 100 will be described.

First, an operation example of the image forming apparatus 1 will be described.

Figure 15:
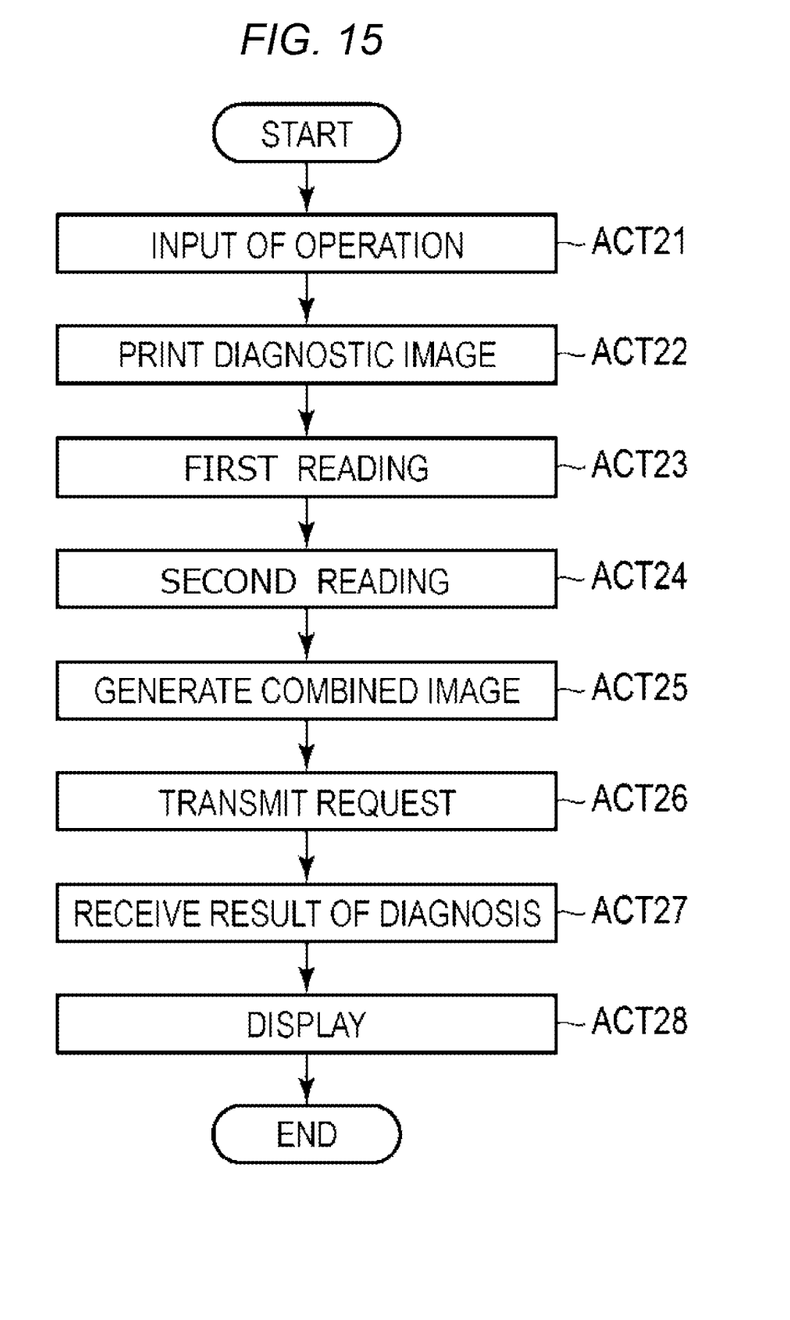
FIG. 15 is a flowchart illustrating an operation example of an image forming apparatus.

FIG. 15 is a flowchart illustrating the operation example of the image forming apparatus 1.

The processor 11 of the image forming apparatus 1 receives the input of the operation for starting the diagnosis of the defect through the operation panel 15 (ACT21). If the input of the operation for starting the diagnosis of the defect is received, the processor 11 prints the diagnostic image 40 on the sheet of paper by using the forming unit 20 (ACT22).

If the diagnostic image 40 is printed on the sheet of paper, the processor 11 scans the sheet of paper on which the diagnostic image 40 is printed by using the first reading mechanism 16 (ACT23). If the sheet of paper is scanned by using the first reading mechanism 16, the processor 11 scans the sheet of paper on which the diagnostic image 40 is printed by using the second reading mechanism 17 (ACT24).

If the sheet of paper is scanned by using the second reading mechanism 17, the processor 11 generates the first combined image and the second combined image from the first image and the second image, respectively (ACT25). If the first combined image and the second combined image are generated, the processor 11 transmits the request including the first combined image and the second combined image to the server 2 through the communication interface 14 (ACT26).

If the request is transmitted, the processor 11 receives the response including the diagnosis result from the server 2 through the communication interface 14 (ACT27). If the response is received, the processor 11 displays the diagnosis result through the operation panel 15 (ACT28).

If the diagnosis result is displayed, the processor 11 ends the operation.

Next, an operation example of the server 2 will be described.

Figure 16:
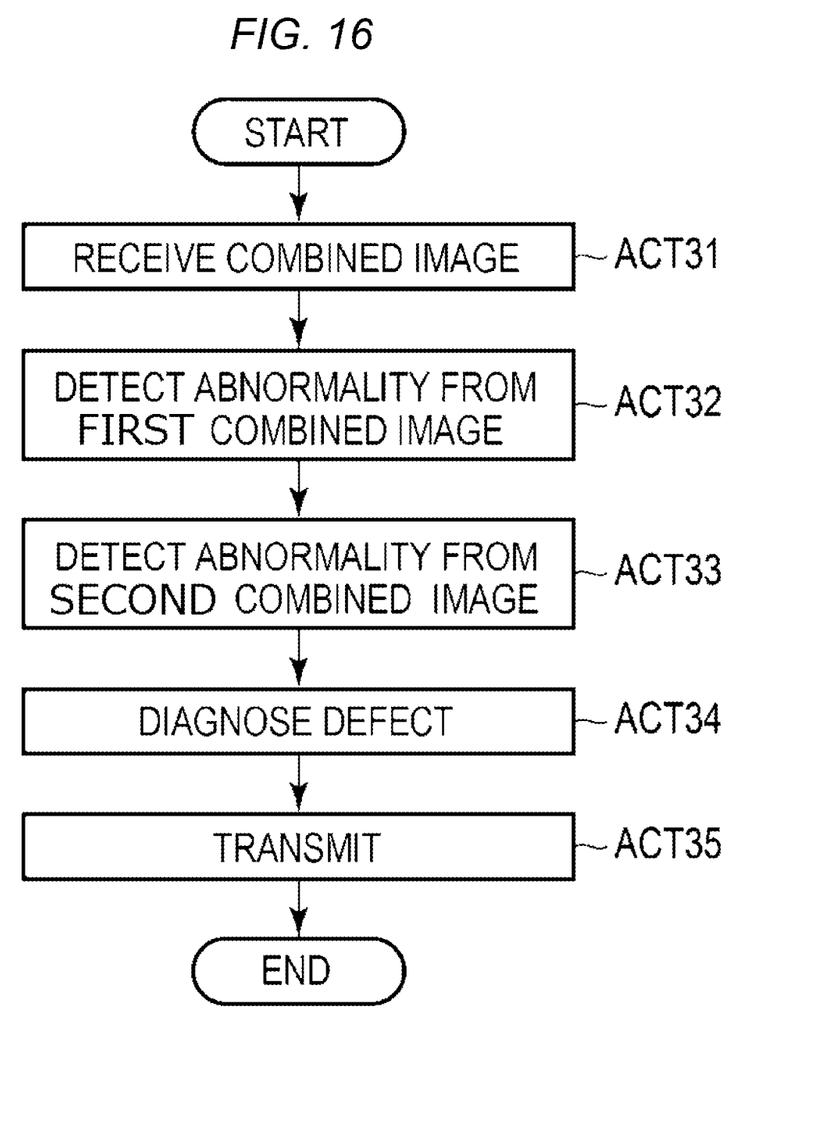
FIG. 16 is a flowchart illustrating an operation example of the server.

FIG. 16 is a flowchart illustrating the operation example of the server 2.

First, the processor 21 of the server 2 receives the request including the first combined image and the second combined image from the image forming apparatus 1 through the communication unit 25 (ACT31). If the request is received, the processor 21 detects the abnormality from the first combined image (ACT32).

If the abnormality is detected from the first combined image, the processor 21 detects the abnormality from the second combined image (ACT33). If the abnormality is detected from the second combined image, the processor 21 diagnoses the defect based on the detection result from the first combined image and the detection result from the second combined image (ACT34).

If the defect is diagnosed, the processor 21 transmits the response including the diagnosis result of the defect to the image forming apparatus 1 through the communication unit 25 (ACT35).

If the response is transmitted to the image forming apparatus 1, the processor 21 ends the operation.

It is noted that the diagnostic system 100 may include the plurality of image forming apparatuses 1. The server 2 may return the response including the diagnosis result to each image forming apparatus 1 with respect to the request from the plurality of image forming apparatuses 1.

In addition, the processor 21 of the server 2 may transmit the detection result of the abnormality from the first combined image and the second combined image to the image forming apparatus 1. In this case, the processor 11 of the image forming apparatus 1 may diagnose the defect based on the detection result from the server 2.

In addition, the processor 21 may detect the type (position, size, mode, or the like) of the streak in addition to the presence or absence of the streak as the abnormality detected from the first combined image and the second combined image. In addition, the processor 21 may detect the abnormality (deviation, skew, dirt distortion, or the like) other than the streak from the first combined image and the second combined image.

In the above-described case, the diagnosis table illustrates the defects corresponding to combinations of abnormalities. The processor 21 diagnoses the defect according to the diagnosis table.

In addition, the processor 21 may diagnose the defect based on the detection result from the first combined image and the second combined image by using the inference model. For example, the inference model may be a model obtained by deep learning based on a data set of the detection result from the first combined image and the second combined image and the defect (presence or absence and occurrence location).

In the diagnostic system configured as described above, the defect is diagnosed by the server. As a result, the diagnostic system can update the diagnostic algorithm in the entire diagnostic system by updating a defect diagnostic algorithm in the server.

In addition, the diagnostic system generates the combined image by extracting a portion necessary for diagnosis from the image used for diagnosis in the image forming apparatus. The diagnostic system transmits the generated combined image from the image forming apparatus to the server. As a result, the diagnostic system can reduce the amount of data transmitted from the image forming apparatus to the server.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus comprising:
a printer configured to print an image having diagnostic information on a sheet of paper;
a first reader configured to read a first image from the sheet of paper;
a second reader configured to read a second image from the sheet of paper;
a processor configured to cause a display to display a diagnosis result of a defect based on the first image and the second image; and
a communicator configured to transmit data to an external device and receive data from the external device;
wherein the processor is further configured to:
generate a first combined image by extracting a first target region from the first image,
generate a second combined image by extracting a second target region from the second image, and
cause the communicator to transmit the first combined image and the second combined image to the external device.

2. The image forming apparatus of claim 1, wherein the processor is further configured to:
detect a first abnormality from the first image,
determine a first location of the first abnormality,
detect a second abnormality from the second image,
determine a second location of the second abnormality, and
diagnose the defect to obtain the diagnosis result based on the first location and the second location.

3. The image forming apparatus of claim 2, wherein the processor is further configured to:
detect a first streak based on the first abnormality, and
detect a second streak based on the second abnormality.

4. The image forming apparatus of claim 2, further comprising a memory configured to store a diagnosis table in which the first location, the second location, and the diagnosis result are associated with each other, wherein the processor is further configured to diagnose the defect based on the diagnosis table.

5. The image forming apparatus of claim 1, wherein the communicator is further configured to obtain the diagnosis result from the external device and provide the diagnosis result to the processor.

6. The image forming apparatus of claim 1, wherein the processor is further configured to:
generate the first combined image by extracting a first streak region for detecting a first streak from the first image, and
generate the second combined image by extracting a second streak region for detecting a second streak from the second image.

7. The image forming apparatus of claim 1, wherein:
the first reader is configured to read the first image from the sheet of paper when the sheet of paper is set on a platen, and
the second reader is configured to read the second image from the sheet of paper while the sheet of paper is conveyed by a document feeder.

8. The image forming apparatus of claim 1, wherein the defect is associated with the first reader, the second reader, or the printer.

9. The image forming apparatus of claim 1, wherein the processor is further configured to cause the display to display, as the diagnosis result:
an indication of a presence or absence of the defect, and
an occurrence location of the defect.

10. The image forming apparatus of claim 1, wherein the processor is further configured to cause the display to display, as the diagnosis result, a solution for the defect.

11. An image forming apparatus comprising:
a printer configured to print an image having diagnostic information on a sheet of paper;
a first reader configured to read a first image of the image having diagnostic information;
a second reader configured to read a second image of the image having diagnostic information; and
a processor configured to:
determine whether a first abnormality is present in the first image,
determine whether a second abnormality is present in the second image, and
cause a display to display a diagnosis result of a defect when at least one of: the first abnormality is present in the first image or the second abnormality is present in the second image;
wherein the image having diagnostic information comprises:
a plurality of bands, each of the bands corresponding to a different color,
a plurality of ruled lines, and
an anchor positioned between one of the bands and a plurality of the ruled lines.

12. The image forming apparatus of claim 11, wherein at least one of the first abnormality or the second abnormality is based on at least one of the bands.

13. The image forming apparatus of claim 11, wherein at least one of the first abnormality or the second abnormality is based on at least one of the ruled lines.

14. The image forming apparatus of claim 11, wherein at least one of the first abnormality or the second abnormality is based on the anchor.

15. An image forming apparatus comprising:
a printer configured to print an image having diagnostic information on a sheet of paper;
a first reader configured to read a first image of the sheet of paper;
a second reader configured to read a second image of the sheet of paper; and
a processor configured to:
determine whether a first abnormality is present in the first image,
determine a first location of the first abnormality on the sheet of paper when the first abnormality is present in the first image,
determine whether a second abnormality is present in the second image,
determine a second location of the second abnormality on the sheet of paper when the second abnormality is present in the second image,
determine a diagnosis result of a defect based on at least one of the first location or the second location, and
cause a display to display the diagnosis result;
wherein the image having diagnostic information comprises:
a plurality of bands, each of the bands corresponding to a different color,
a plurality of ruled lines, and
an anchor positioned between one of the bands and a plurality of the ruled lines, the anchor being a solid black square; and
wherein at least one of the first abnormality or the second abnormality is based on at least one of:
at least one of the bands,
at least one of the ruled lines, or
the anchor.

16. The image forming apparatus of claim 15, further comprising a memory configured to store the first location, the second location, and the diagnosis result in a table such that the diagnosis result is associated with the first location and the second location.

17. The image forming apparatus of claim 16, wherein the processor is further configured to use the table to determine the diagnosis result.

* * * * *